United States Patent [19]
Neumann

[11] 3,989,008
[45] Nov. 2, 1976

[54] DOG BED

[76] Inventor: Gerhard Neumann, Schuckstr. 1, D 75 Karlsruhe 1, Germany

[22] Filed: May 13, 1975

[21] Appl. No.: 577,110

[30] Foreign Application Priority Data
May 14, 1974 Germany............................ 2423350
July 2, 1974 Germany............................ 2431633

[52] U.S. Cl. ..................................... 119/1; 119/19
[51] Int. Cl.² ............................................ A01K 1/00
[58] Field of Search .................................... 119/19, 1

[56] References Cited
UNITED STATES PATENTS

| | | | |
|---|---|---|---|
| 1,976,234 | 10/1934 | Larson | 119/19 |
| 2,032,248 | 2/1936 | Bins | 119/1 |
| 3,087,458 | 4/1963 | Bennett, Jr. | 119/19 X |
| 3,565,040 | 2/1971 | Pohl | 119/19 X |
| 3,618,568 | 11/1971 | Breeden | 119/19 |
| 3,842,454 | 10/1974 | Young | 119/1 X |

*Primary Examiner*—Hugh R. Chamblee
*Attorney, Agent, or Firm*—Walter Becker

[57] ABSTRACT

A dog bed comprising a first resting place for a dog which resting place is arranged in a housing comprising a bottom plate and having walls and being closed on all sides with the exception of a section comprising an entrance for the dog. The dog bed includes a second resting place provided in vertically spaced relationship to the first resting place which latter is open to all sides.

8 Claims, 9 Drawing Figures

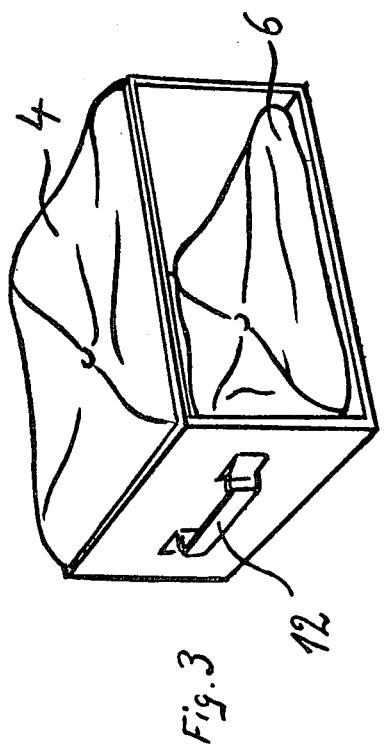
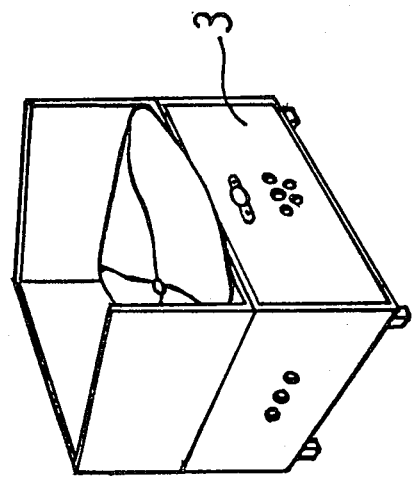
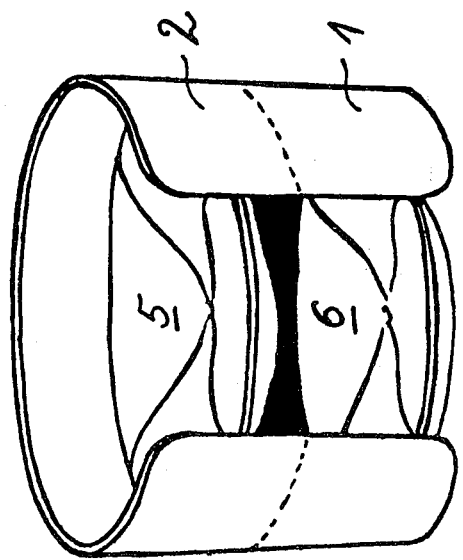

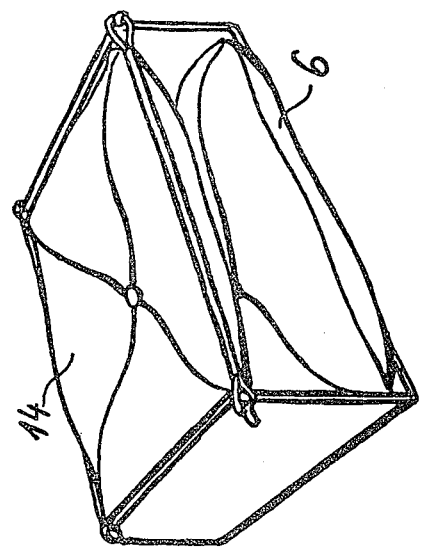

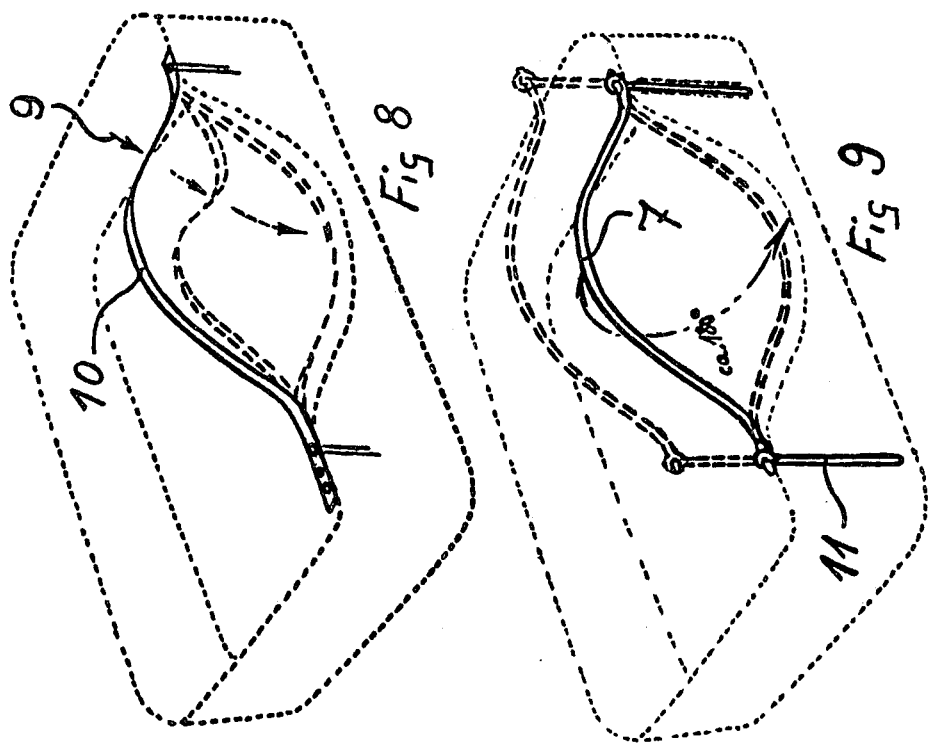
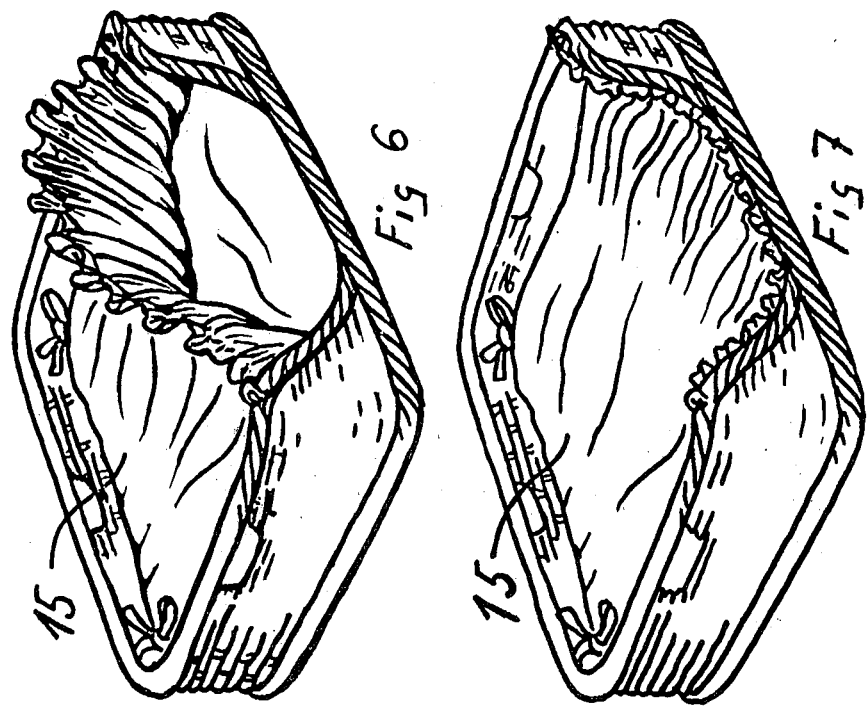

DOG BED

The present invention relates to a dog bed which comprises a lying-down area which is arranged inside a housing. The housing comprises a bottom plate which with the exception of an entrance opening is surrounded by wall sections which are approximately vertical to said bottom plate.

Dog beds of the above mentioned type are usually known as dog baskets inasmuch as customarily they are woven of wicker. These customary dog baskets generally afford the animals only the possibility of lying down on the support and at best to snuggle themselves on or into the corners. In this way, however, the heretofore known dog baskets do not satisfy the inborn instinct of these animals, especially dogs, inasmuch as such animals where possible like to withdraw into recesses or at least into trough-like depressions.

It is an object of this invention to overcome the above mentioned defect and to create a dog bed in which the animal has the possibility of freely lying down upon a lying-down area or to crawl into a cavity.

This object and other objects and advantages of the invention will appear more clearly from the following specification in connection with the accompanying drawings, in which:

FIG. 1 illustrates a first embodiment of the invention in which the dog bed has an approximately round shape.

FIG. 2 shows a second embodiment of the invention which comprises two superimposed housings of a square-shaped contour.

FIG. 3 represents a modification of the embodiment of FIG. 2.

FIG. 4 is a design similar to that of FIG. 3.

FIG. 5 represents a design with a sleeping bag.

FIG. 6 shows an embodiment similar to that of FIG. 5, however, with a variable yoke in open condition.

FIG. 7 shows the same design as FIG. 6 but in closed condition.

FIGS. 8 and 9 respectively show two yoke constructions.

The dog bed according to the present invention is characterized primarily in that above the lying-down area there is provided an additional lying-down area. The additional lying-down area may be formed by placing another housing with the lying-down area upon the first housing or the lying-down areas are formed by a bag while the lying-down area for crawling into the inside of the bag and lying-down area for freely lying down forms the topside of the bag. In both instances, the animal has the possibility to crawl into a cavity which is formed either by the closed-off space of the lower lying-down area when a second housing is superimposed thereon or by the lower lying-down area of the sleeping bag, and has the further possibility to freely lie down thereon either by lying down onto the upper lying-down area of the superimposed housing or upon the topside of said sleeping bag. In this way, the drawbacks of the heretofore customary dog beds are avoided and a construction is obtained which satisfies the instinct of these animals. If the additional lying-down area is formed by superimposing an additional housing with a lying-down area, the superimposed additional housing may have no or only slightly protruding wall portions whereby it will be possible for the animal without difficulties to jump onto the elevated lying-down area. Moreover, there is also given the possibility to close the inlet opening of the lower housing by means of a flap or a gate and thus to make the entire dog bed portable and to transform it into a means for transporting the animal.

If the additional lying-down area is formed by the topside of a bag-shaped lying-down area with the opening pointing toward the inlet side, it is advisable to keep open the opening of the bag-shaped lying-down area by means of a yoke, wire or the like which is preferably bent in the form of a gate or arc. Due to this step, it is possible for the animal without difficulties to crawl into the bag-shaped lying-down area. If the yoke is designed so that it can be folded over at the wall portions of the housing which confine the inlet opening of the housing, there also exists the possibility of closing the bag-shaped lying-down area and thus to bar the entry of the animal. A similar purpose can be obtained by making the arc of spring elastic material which by pressing or lifting can be brought into any desired position. Moreover, it is advisable to make the guiding of the yoke adjustable as to height in order to adapt the opening to the size of the animal. For the same reason, it is also desirable that the housing which forms additional lying-down areas is adjustable as to height and arranged on the lower housing.

Advantageously, the bag-shaped lying-down area is formed by connecting the rim portions of two single lying-down areas while the connection may also be disengaged for instance when effecting the connection by a slide fastener.

Referring now to the drawings in detail, and in particular to FIG. 1, the arrangement shown therein comprises a lower lying-down area 6 which is inserted into a housing 1. Placed upon this housing 1 is a second housing 2 with a second lying-down area 5. Due to this arrangement the dog has the possibility freely to lie down on the additional lying-down area 5 and also has the possibility of crawling into the cavity with the lying-down area 6 which last mentioned cavity is formed by the placement of the housing 2 on the housing 1.

FIG. 2 is an arrangement similar to that of FIG. 1, but in this instance the entry to the cavity with the lying-down area 6 is closed by a flap 3. A further embodiment of the invention is illustrated in FIG. 3. With this design an additional lying-down area 4 is placed upon the housing with the lower lying-down area 6. No walls are provided for the upper lying-down area with the design of FIG. 3. Furthermore, the housing wall is equipped with a handle 12 for transporting the dog bed.

FIG. 4 illustrates an embodiment similar to that of FIG. 3, in which, however, an upper lying-down area 14 is employed, which rests upon the lower lying-down area 6. Due to a corresponding light design of this lying-down area 14 the animal will have the possibility nevertheless to be able to crawl into the cavity and to lie down on the lower lying-down area 6.

FIG. 5 illustrates a dog bed with a bag-shaped lying-down area. In this instance the topside of the bag opening is connected to a yoke 13 so that it will be possible for the dog to crawl through this opening into the thus formed sleeping bag. If the dog wants to lie down freely he can without difficulty use for this purpose the topside 15 of this bag-shaped lying-down area.

FIGS. 6 and 7 respectively illustrate an embodiment which is similar to that of FIG. 5. In this instance the yoke 13 fixedly connected to the housing is replaced by a foldable yoke 7 as indicated in FIG. 9. According to FIG. 6, this yoke is fixed in its upper position which means that the entry into the sleeping bag is opened. Also with this open position it is possible for the dog without any difficulties to lie down on the upper lying-down area 15.

FIG. 7 shows the same dog bed as FIG. 6 but with downwardly folded yoke 7. In this instance, only the upper lying-down area 15 can be used.

The details of the connection for the yoke will be evident from FIG. 9. FIG. 9 shows also how the yoke 7 is held in guiding means 11 which are adjustable as to height.

Finally, FIG. 8 shows an embodiment for the yoke according to the invention of spring elastic material. By exerting pressure, approximately in the direction of the arrow 9, the thus formed yoke 10 will be moved into a lower position whereby the lower lying-down area or the sleeping bag is closed. By changing the active length of said yoke 10 by the latter on the lateral wall sections so that its length is variable, it is also possible to to adapt the height of the inlet to the size of the animal.

It is, of course, to be understood that the present invention is, by no means, limited to the specific showing in the drawings, but also comprises any modifications within the scope of the appended claims.

What I claim is:

1. A dog bed which includes in combination: housing means comprising a bottom plate with a first resting place and also comprising wall means extending substantially vertically to said bottom plate while defining an entrance to said first resting place, and supporting means arranged in vertically spaced relationship to said bottom plate and forming a second resting place acceptable directly therewith, a sleeping bag having an opening in alignment with said entrance, the top of said sleeping bag forming said supporting means, a flexible frame section associated with said entrance and operable selectively to hold said entrance open and to close said entrance, and guiding means associated with said wall means said flexible frame means being guided by said guiding means and being foldable selectively into said entrance opening position and entrance closing position.

2. A dog bed in combination according to claim 1, in which said supporting means is formed by additional housing means superimposed upon said first mentioned housing means.

3. A dog bed in combination according to claim 2, in which said supporting means is open toward all sides.

4. A dog bed in combination according to claim 3, which includes confining means associated with said entrance and operable selectively for closing the same.

5. A dog bed in combination according to claim 1, in which said sleeping bag is formed by connecting said first and second resting places along the rims thereof.

6. A dog bed in combination according to claim 1, which includes means detachably interconnecting said first and second resting places.

7. A dog bed in combination according to claim 1, in which said flexible frame section is of spring-elastic material.

8. A dog bed in combination according to claim 1, in which said flexible frame means is adjustable as to height on said guiding means.

* * * * *